US008332210B2

(12) United States Patent
Nilsson et al.

(10) Patent No.: US 8,332,210 B2
(45) Date of Patent: Dec. 11, 2012

(54) REGENERATION OF WIDEBAND SPEECH

(75) Inventors: Mattias Nilsson, Sundbyberg (SE); Soren Vang Andersen, Aalborg (DK)

(73) Assignee: Skype, Dublin (IE)

( * ) Notice: Subject to any disclaimer, the term of this patent is extended or adjusted under 35 U.S.C. 154(b) by 850 days.

(21) Appl. No.: 12/456,012

(22) Filed: Jun. 10, 2009

(65) Prior Publication Data

US 2010/0145684 A1 Jun. 10, 2010

(30) Foreign Application Priority Data

Dec. 10, 2008 (GB) .................................. 0822536.9

(51) Int. Cl.

| | |
|---|---|
| ***G10L 11/00*** | (2006.01) |
| ***G10L 19/00*** | (2006.01) |
| ***G10L 19/14*** | (2006.01) |
| ***G10L 11/04*** | (2006.01) |
| ***G10L 21/02*** | (2006.01) |
| ***G06F 15/00*** | (2006.01) |

(52) U.S. Cl. ..................... 704/205; 704/200; 704/200.1; 704/207; 704/225; 704/228

(58) Field of Classification Search .................. 704/200, 704/200.1, 205, 207, 228, 225
See application file for complete search history.

(56) References Cited

U.S. PATENT DOCUMENTS

| | | | | |
|---|---|---|---|---|
| 4,734,795 | A | 3/1988 | Fukami et al. | |
| 5,012,517 | A * | 4/1991 | Wilson et al. | 704/207 |
| 5,060,269 | A * | 10/1991 | Zinser | 704/220 |
| 5,214,708 | A | 5/1993 | McEachern et al. | |
| 5,305,420 | A * | 4/1994 | Nakamura et al. | 704/271 |
| 5,621,856 | A * | 4/1997 | Akagiri | 704/200.1 |
| 5,687,191 | A * | 11/1997 | Lee et al. | 375/216 |
| 5,715,365 | A | 2/1998 | Griffin et al. | |
| 5,956,674 | A * | 9/1999 | Smyth et al. | 704/200.1 |
| 6,055,501 | A | 4/2000 | MacCaughelty | |
| 6,058,360 | A * | 5/2000 | Bergstrom | 704/219 |
| 6,188,981 | B1 * | 2/2001 | Benyassine et al. | 704/233 |
| 6,226,606 | B1 * | 5/2001 | Acero et al. | 704/218 |
| 6,424,939 | B1 * | 7/2002 | Herre et al. | 704/219 |
| 6,453,283 | B1 | 9/2002 | Gigi | |
| 6,456,963 | B1 * | 9/2002 | Araki | 704/200.1 |

(Continued)

FOREIGN PATENT DOCUMENTS

CA 2618316 7/2008

(Continued)

OTHER PUBLICATIONS

Makhoul, J., et al., "High-Frequency Regeneration in Speech Coding Systems," *IEEE*, pp. 428-431 (1979).

(Continued)

*Primary Examiner* — Eric Yen
(74) *Attorney, Agent, or Firm* — Wolfe-SBMC

(57) ABSTRACT

A system and method for processing a narrowband speech signal comprising speech samples in a first range of frequencies. the method comprises: generating from the narrowband speech signal a highband speech signal in a second range of frequencies above the first range of frequencies; determining a pitch of the highband speech signal; using the pitch to generate a pitch-dependent tonality measure from samples of the highband speech signal; and filtering the speech samples using a gain factor derived from the tonality measure and selected to reduce the amplitude of harmonics in the highband speech signal.

20 Claims, 3 Drawing Sheets

U.S. PATENT DOCUMENTS

| | | | | |
|---|---|---|---|---|
| 6,507,820 | B1 * | 1/2003 | Deutgen | 704/500 |
| 6,526,384 | B1 | 2/2003 | Mueller et al. | |
| 6,680,972 | B1 | 1/2004 | Liljeryd et al. | |
| 6,687,667 | B1 * | 2/2004 | Gournay et al. | 704/222 |
| 6,917,911 | B2 * | 7/2005 | Schultz | 704/206 |
| 7,003,451 | B2 * | 2/2006 | Kjorling et al. | 704/206 |
| 7,171,357 | B2 * | 1/2007 | Boland | 704/231 |
| 7,177,803 | B2 * | 2/2007 | Boillot et al. | 704/209 |
| 7,337,118 | B2 * | 2/2008 | Davidson et al. | 704/258 |
| 7,359,854 | B2 | 4/2008 | Nilsson et al. | |
| 7,398,204 | B2 * | 7/2008 | Najaf-Zadeh et al. | 704/207 |
| 7,433,817 | B2 | 10/2008 | Kjörling et al. | |
| 7,461,003 | B1 | 12/2008 | Tanrikulu | |
| 7,478,045 | B2 * | 1/2009 | Allamanche et al. | 704/236 |
| 7,792,679 | B2 * | 9/2010 | Virette et al. | 704/500 |
| 7,848,921 | B2 * | 12/2010 | Ehara | 704/216 |
| 8,041,577 | B2 | 10/2011 | Smaragdis et al. | |
| 8,078,474 | B2 * | 12/2011 | Vos et al. | 704/500 |
| 8,160,889 | B2 | 4/2012 | Iser et al. | |
| 2001/0029445 | A1 | 10/2001 | Charkani | |
| 2002/0165711 | A1 * | 11/2002 | Boland | 704/231 |
| 2003/0009327 | A1 | 1/2003 | Nilsson et al. | |
| 2003/0012221 | A1 | 1/2003 | El-Maleh et al. | |
| 2003/0028386 | A1 | 2/2003 | Zinser, Jr. et al. | |
| 2003/0050786 | A1 | 3/2003 | Jax et al. | |
| 2003/0158726 | A1 | 8/2003 | Philippe et al. | |
| 2006/0149532 | A1 * | 7/2006 | Boillot et al. | 704/203 |
| 2006/0200344 | A1 | 9/2006 | Kosek et al. | |
| 2006/0277039 | A1 * | 12/2006 | Vos et al. | 704/219 |
| 2008/0077399 | A1 | 3/2008 | Yoshida | |
| 2008/0120117 | A1 * | 5/2008 | Choo et al. | 704/500 |
| 2008/0177532 | A1 | 7/2008 | Greiss et al. | |
| 2008/0195392 | A1 | 8/2008 | Iser et al. | |
| 2008/0270125 | A1 * | 10/2008 | Choo et al. | 704/205 |
| 2010/0145685 | A1 | 6/2010 | Nilsson et al. | |
| 2010/0223052 | A1 | 9/2010 | Nilsson et al. | |

FOREIGN PATENT DOCUMENTS

| | | | |
|---|---|---|---|
| EP | 1 300 833 | A2 | 4/2002 |
| WO | WO-9857436 | | 12/1998 |
| WO | WO 01/35395 | A1 | 5/2001 |
| WO | WO 02/056301 | A1 | 7/2002 |
| WO | WO 03/003600 | A1 | 1/2003 |
| WO | WO-03044777 | | 5/2003 |
| WO | WO-2004072958 | | 8/2004 |
| WO | WO 2006/116025 | A1 | 11/2006 |

OTHER PUBLICATIONS

Notification of Transmittal of the International Search Report and the Written Opinion of the International Searching Authority, or the Declaration, for International Appl. No. PCT/EP2009/066847, dated May 31, 2010.

International Search Report for Application No. GB0822536.9, dated Mar. 27, 2009, 1 page.

"Non-Final Office Action", U.S. Appl. No. 12/456,033, (Jul. 23, 2012), 22 pages.

"Non-Final Office Action", U.S. Appl. No. 12/635,235, (Aug. 24, 2012), 15 pages.

"International Search Report and Written Opinion", PCT Application PCT/EP2009/066876, (Jun. 11, 2010), 7 pages.

"International Search Report", GB Application 0822537.7, (Apr. 6, 2009), 1 page.

* cited by examiner

REGENERATION OF WIDEBAND SPEECH

RELATED APPLICATION

This application claims priority under 35 U.S.C. §119 or 365 to Great Britain Application No. 0822536.9, filed Dec. 10, 2008. The entire teachings of the above application are incorporated herein by reference.

The present invention lies in the field of artificial bandwidth extension (ABE) of narrowband telephone speech, where the objective is to regenerate wideband speech from narrowband speech in order to improve speech naturalness.

In many current speech transmission systems (phone networks for example) the audio bandwidth is limited, at the moment to 0.3-3.4 kHz. Speech signals typically cover a wider band of frequencies, between 0 and 8 kHz being normal. For transmission, a speech signal is encoded and sampled, and a sequence of samples is transmitted which defines speech but in the narrowband permitted by the available bandwidth. At the receiver, it is desired to regenerate the wideband speech using an ABE method.

In a paper entitled "High Frequency Regeneration in Speech Coding Systems", authored by Makhoul, et al, IEEE International Conference Acoustics, Speech and Signal Processing, April 1979, pages 428-431, there is a discussion of various high frequency generation techniques for speech, including spectral translation. In a spectral translation approach, the wideband excitation is constructed by adding up-sampled low pass filtered narrow band excitation to a mirrored up-sampled and high pass filtered narrowband excitation. In such a spectral translation-based excitation regeneration scheme, where a part or the whole of a narrowband excitation signal is shifted up in frequency, it is common that the resulting recovered signal is perceived as a bit metallic due to overly strong harmonics.

It is an aim of the present invention to generate more natural wideband speech from a narrowband speech signal.

According to an aspect of the present invention there is provided a method or processing a narrowband speech signal comprising speech samples in a first range of frequencies, the method comprising: generating from the narrowband speech signal a highband speech signal in a second range of frequencies above the first range of frequencies; determining a pitch of the highband speech signal; using the pitch to generate a pitch-dependent tonality measure from samples of the highband speech signal; and filtering the speech samples using a gain factor derived from the tonality measure and selected to reduce the amplitude of harmonics in the highband speech signal.

Another aspect provides a method of regenerating a wideband speech signal at a receiver which receives a narrowband speech signal in encoded form via a transmission channel, the method comprising: decoding the received signal to generate speech samples of a narrowband speech signal; regenerating from the narrowband speech signal a highband speech signal, the highband speech signal having a range of frequencies above that of the narrowband speech signal; determining a pitch of the high hand speech signal; using the pitch to generate a pitch-dependent tonality measure from samples of the highband speech signal; filtering the speech samples using a gain factor derived from the tonality measure and selected to reduce the amplitude of harmonics in the highband speech signal; and combining the filtered highband speech signal with the narrowband speech signal to regenerate the wideband speech signal.

Another aspect of the invention provides a system for processing a narrowband speech signal comprising speech samples in a first range of frequencies, the system comprising: means for generating from the narrowband speech signal a highband speech signal in a second range of frequencies above the first range of frequencies; means for determining a pitch of the highband speech signal; means for generating a pitch-dependent tonality measure from samples of the highband speech signal using the pitch; and means for filtering the speech samples using a gain factor derived from the tonality measure and selected to reduce the amplitude of harmonics in the highband speech signal.

The gain factor can be further based on a constant value, K, as a multiplier of the tonality measure.

One way of determining the tonality measure is to combine speech samples from a block of speech samples in the highband speech region with equivalently positioned speech samples from the block delayed by the pitch.

For a better understanding of the present invention and to show how the same may be carried into effect reference will now be made by way of example to the accompanying drawings, in which.

Figure 1:
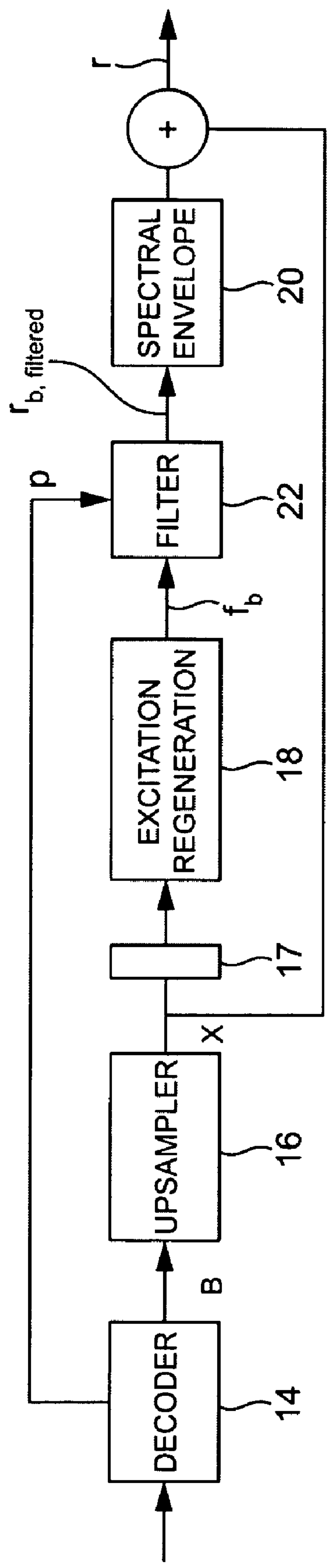
FIG. 1 is a schematic block diagram illustrating an ABE system in a receiver.

FIG. 1 is a schematic block diagram illustrating an artificial bandwidth extension system in a receiver. A decoder 14 receives a speech signal over a transmission channel and decodes it to extract a baseband speech signal B. This is typically at a sampling frequency of 8 kHz. The baseband signal B is up-sampled in up-sampling block 16 to generate an up-sampled decoded narrowband speech signal x in a first range of frequencies, e.g. 0-4 kHz (0.3 to 3.4 kHz). The speech signal x is subject to a whitening filter 17 and highband excitation regeneration in excitation regeneration block 18. The thus regenerated extension (high) frequency band $r_b$ of the speech signal is subject to a filtering process in filter block 22. An estimation of the wideband spectral envelope is then applied at block 20. The signal is then added, at adder 21, to the incoming narrowband speech signal x to generate the wideband recovered speech signal r. The highband speech signal is in a second range of frequencies, e.g. 4-6 kHz.

The speech signal r comprises blocks of samples, where in the following n denotes a sample index.

Figure 2:
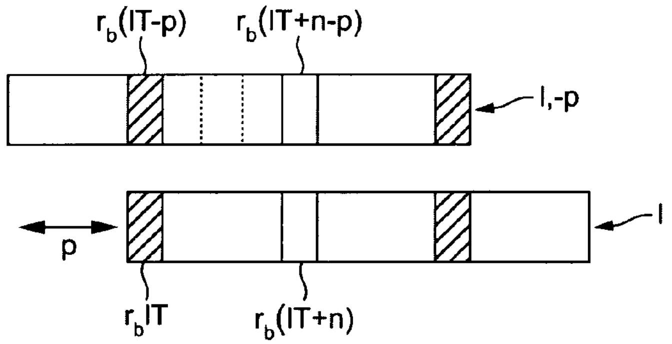
FIG. 2 is a schematic block diagram illustrating blocks of speech samples.

As shown in FIG. 2, $r_b(I)$ denotes a block I of length T [T samples] of a frequency band b in the regenerated speech signal. In the present embodiment, $r_b$ is sampled at 12 kHz and is in the range 4-6 kHz.

$r_b(I)=[r_b(IT), \ldots, r_b(T(I+1)-1)]$, where IT denotes the first sample (index n=0).

$r_b(I,*-p)=[r_b(IT-p), \ldots, r_b((I+1)T-1-p)]$. This denotes an equivalent block delayed by one pitch period p. *[N.B.—I've included the minus sign −p]

The pitch p is often readily available in the decoder 14 in a known fashion.

Figure 3:
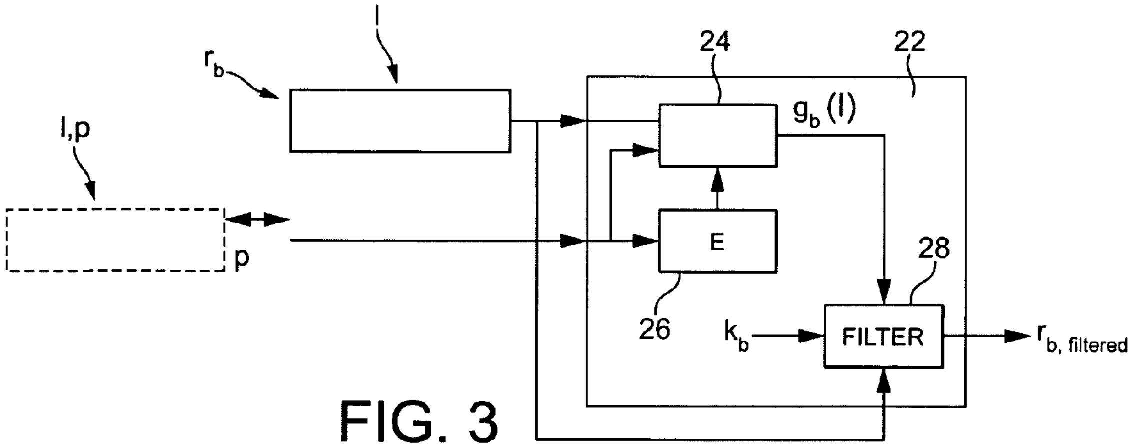
FIG. 3 is a schematic block diagram illustrating a filtering function.

The speech blocks are also shown schematically in FIG. 3. They are supplied to the filter processing function 22 which processes the incoming speech blocks $r_b(I)$ and $r_b(I,-p)$ to generate filtered speech $r_{b,filtered}$.

A tonality measure generation block 24 generates a tonality measure $g_b(I)$ for block I in band b by generating the inner product (<,>) between $r_b(I)$ and $r_b(I,-p)$ normalised by the energy of $r_b(I,-p)$. The energy of $r_b(I-p)$ is determined by energy determination block 26 as $<r_b(I,-p),r_b(I,-p)>$.

Thus, $g_b(I)=<r_b(I), r_b(I,-p)>/<r_b(I,-p), r_b(I,-p)>+W)$, where W is a stabilising term to handle low energy regions which would cause abrupt and incorrect tonality measures at speech onsets. In the present example, $g_b$ is constrained to lie between 0 and 1 and W is 100 T. Looking at FIG. 2, the tonality measure is the sum of the product of overlapping samples of the two blocks, starting at $r_b(IT)*r_b(IT-p)$ (shown shaded), up to the end two blocks, also shown shaded.

Having generated the tonality measure, the metallic artefacts which may remain due to the wideband regeneration process are now filtered by filter 28. Filter 28 applies the following filtering operation:

$$r_{b,filtered}(IT+n)=(1+K_bg_b)^{-1}(r_b(IT+n)-K_bg_br_b(IT+n-p))$$

where n denotes the sample index and $K_b$ is a constant that together with the tonality measure $g_b(I)$ determines the amount of "pitch destruction" applied. $K_b$ is determined appropriately and can lie for example between 0 and 1.5. In the preferred embodiment $k_b$ is 0.3. The factor $(1+K_bg_b)^{-1}$ can be seen as a tonality dependent gain factor lowering the energy of the reconstructed signal even further when the signal shows strong tonality. More specifically, it reduces the energy of the current sample (index n) by dividing it by the gain factor and then subtracting the pitch delayed equivalent sample. An example of the effect of the filtering process is shown in FIG. 4.

Figure 4:
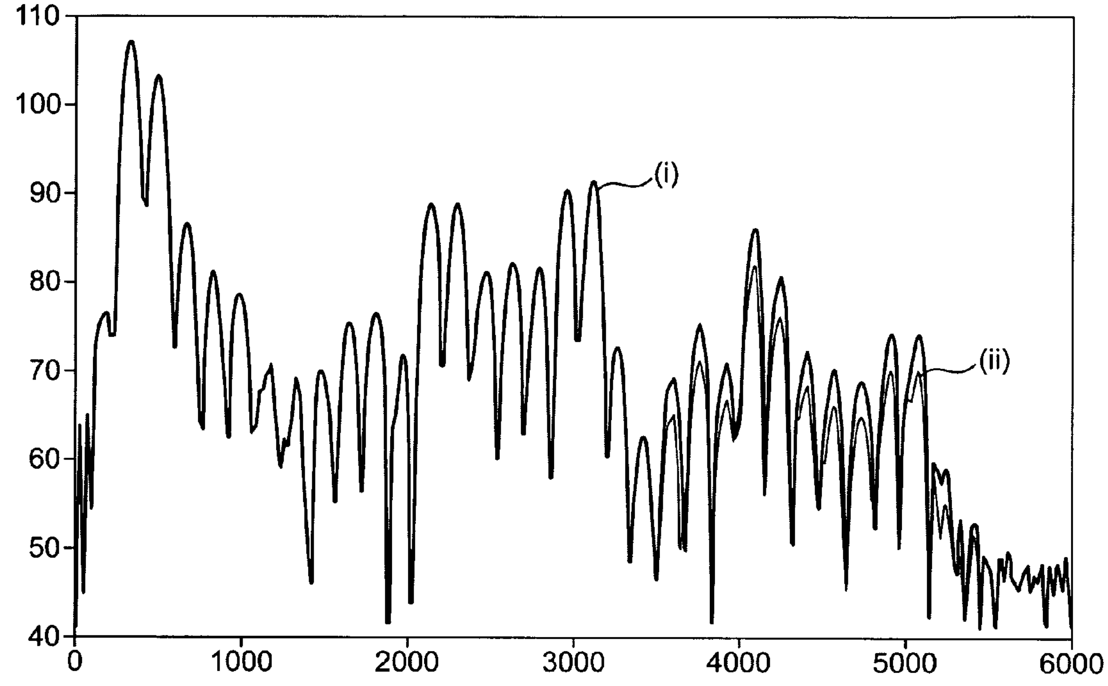
FIG. 4 is a graph illustrating the effect of filtering on the highband regenerated speech region.

FIG. 4 is a plot showing the spectrum of speech with respect to frequency. (i) denotes the spectra prior to filtering and (ii) shows the spectra after filtering (applied to the highband region 4-6 kHz).

Figure 5:
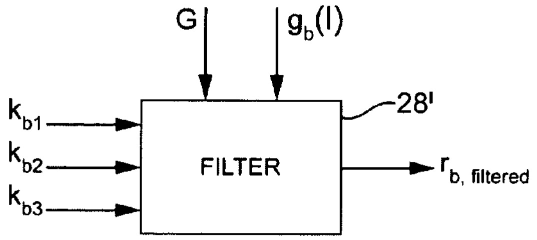
FIG. 5 is a schematic block diagram of a multi-valued filter.

FIG. 5 shows a modified filter denoted 28' for an alternative implementation of the invention. This filter applies an amount of tonality correction weighted over frequency by applying a linear combination of several taps as follows:

$$r_{b,filtered}(IT=n)=G(r_b(IT+n)-K_{b1}g_br_b(IT+n-p-1)-K_{b2}g_br_b(IT+n-p)-K_{b3}g_br_b(IT+n-p+1)).$$

$K_{b1}$, $K_{b2}$ and $K_{b3}$ are different constants that determine the amount of "pitch destruction" applied for each frequency, and can lie between −1 and 1. That is, G is a gain factor applied to the sample at index n, which is then further modified by subtracting gain-modified versions of the equivalent pitch delayed sample (IT+n−p) and those on either side of it.

The invention claimed is:

1. A method of processing a narrowband speech signal comprising speech samples in a first range of frequencies, the method comprising:

generating from the narrowband speech signal, using a computing device, a highband speech signal in a second range of frequencies above the first range of frequencies;

determining, using the computing device, a pitch of the highband speech signal;

using the pitch to generate, using the computing device, a pitch-dependent tonality measure from samples of the highband speech signal, wherein the highband speech signal comprises successive blocks of speech samples, and wherein using the pitch to generate the pitch-dependent tonality measure is carried out by combining speech samples from a block with equivalently positioned speech samples from that block delayed by the pitch; and filtering, using the computing device, the speech samples using a gain factor derived from the tonality measure and selected to reduce the amplitude of harmonics in the highband speech signal.

2. A method according to claim 1, wherein the gain factor is modified by a pre-selected constant value.

3. A method according to claim 1, wherein the generating the pitch-dependent tonality measure comprises normalising the combined speech samples with the energy of the block.

4. The method according to claim 1, wherein generating from the narrowband speech signal a highband speech signal further comprises up-sampling the narrowband speech signal.

5. The method according to claim 4, wherein the up-sampling comprises up-sampling at a rate of 12 kilohertz (kHz).

6. The method according to claim 5, wherein the narrowband speech signal is sampled a rate of 8 kHz.

7. A method of regenerating a wideband speech signal at a receiver which receives a narrowband speech signal in encoded form via a transmission channel, the method comprising:

decoding, using a computing device, the received signal to generate speech samples of a narrowband speech signal;

regenerating from the narrowband speech signal, using the computing device, a highband speech signal, the highband speech signal having frequencies of higher numerical value than frequencies of the narrowband speech signal;

determining, using the computing device, a pitch of the highband speech signal;

using the pitch to generate, using the computing device, a pitch-dependent tonality measure from samples of the highband speech signal, wherein using the pitch to generate the pitch-dependent tonality measure comprises combining speech samples from a block of speech samples in the highband speech signal with equivalently positioned speech samples from the block delayed by the pitch;

filtering, using the computing device, the speech samples using a gain factor derived from the tonality measure and selected to reduce the amplitude of harmonics in the highband speech signal; and combining, using the computing device, the filtered highband speech signal with the narrowband speech signal to regenerate the wideband speech signal.

8. A method according to claim 7, wherein the determining the pitch is carried out by said decoding.

9. A method according to claim 7, further comprising up-sampling the decoded signal, using the computing device, to provide samples of the narrowband speech signal.

10. The method according to claim 7, wherein the gain factor is based, at least in part, on a constant value that lies between the values of 0 and 1.5.

11. The method according to claim 7, wherein the gain factor is based, at least in part, upon three different constant values, wherein each value of the three different constant values lies between the values of −1 and 1.

12. The method according to claim 7, wherein regenerating from the narrowband speech signal a highband speech signal further comprises:

up-sampling, using the computing device, the narrowband speech signal; and subjecting, using the computing device, the up-sampled narrowband speech signal to a whitening filter.

13. The method according to claim 7, wherein combining the filtered highband speech signal with the narrowband speech signal to regenerate the wideband speech signal further comprises:

applying, using the computing device, an estimation of a wideband spectral envelope associated with the wideband speech signal to the filtered highband speech signal; and combining, using the computing device, the filtered highband signal having said estimated wideband spectral envelope, with the narrowband speech signal.

14. A system for processing a narrowband speech signal comprising speech samples in a first range of frequencies, the system comprising:

means for generating from the narrowband speech signal a highband speech signal in a second range of frequencies above the first range of frequencies;

means for determining a pitch of the highband speech signal;

means for generating a pitch-dependent tonality measure from samples of the highband speech signal using the pitch, wherein the means for generating the pitch-dependent tonality measure comprises means for combining speech samples from a block of speech samples in the highband speech signal with equivalently positioned speech samples from the block delayed by the pitch; and means for filtering the speech samples using a gain factor derived from the tonality measure and selected to reduce the amplitude of harmonics in the highband speech signal.

15. A system according to claim 14, in which the means for determining a pitch is provided by a decoder.

16. A system according to claim 14, further comprising means for storing a constant value which is further used in derivation of the gain factor.

17. The system according to claim 14, wherein the means for generating from the narrowband speech signal a highband speech signal further comprises:

means for receiving an encoded signal; and means for decoding the encoded signal into the narrowband speech signal.

18. The system according to claim 17, wherein the means for receiving the encoded signal further comprises means for receiving a signal over a transmission system.

19. The system according to claim 18, wherein the transmission system further comprises one or more phone networks.

20. The system according to claim 14, wherein the system further comprises means for generating a wideband speech signal based, at least in part, on the means for filtering the speech samples and the narrowband speech signal.

* * * * *

UNITED STATES PATENT AND TRADEMARK OFFICE

CERTIFICATE OF CORRECTION

PATENT NO. : 8,332,210 B2
APPLICATION NO. : 12/456012
DATED : December 11, 2012
INVENTOR(S) : Mattias Nilsson et al.

It is certified that error appears in the above-identified patent and that said Letters Patent is hereby corrected as shown below:

Title page, item (57), under "Abstract" column 2, line 3, delete "the" and insert -- The --, therefor.

Signed and Sealed this
Third Day of February, 2015

Michelle K. Lee

Michelle K. Lee
*Deputy Director of the United States Patent and Trademark Office*